(12) United States Patent
Priya et al.

(10) Patent No.: US 11,190,413 B1
(45) Date of Patent: Nov. 30, 2021

(54) SYSTEMS AND METHODS FOR ZERO-TOUCH DEPLOYMENT OF NETWORK SLICES AND NETWORK SLICE ASSURANCE SERVICES

(71) Applicant: Verizon Patent and Licensing Inc., Basking Ridge, NJ (US)

(72) Inventors: Viswanath Kumar Skand Priya, Irving, TX (US); Kristen Sydney Young, Morris Plains, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/993,320

(22) Filed: Aug. 14, 2020

(51) Int. Cl.
*H04L 12/24* (2006.01)

(52) U.S. Cl.
CPC ...... *H04L 41/5045* (2013.01); *H04L 41/5051* (2013.01); *H04L 41/5054* (2013.01)

(58) Field of Classification Search
CPC ............. H04L 41/5045; H04L 41/5051; H04L 41/5054
See application file for complete search history.

(56) References Cited

U.S. PATENT DOCUMENTS

| 2019/0052579 A1* | 2/2019 | Senarath | ............. H04L 41/5048 |
| 2019/0174322 A1* | 6/2019 | Deviprasad | ......... H04L 43/0817 |

\* cited by examiner

*Primary Examiner* — Brian Whipple

(57) ABSTRACT

A system includes one or more devices that include processors. The processors are configured to: receive a request to deploy a network slice within a network, retrieve network service descriptors, from a database, associated with the network slice; and instantiate the network slice within the network based on the network service descriptors.

20 Claims, 15 Drawing Sheets

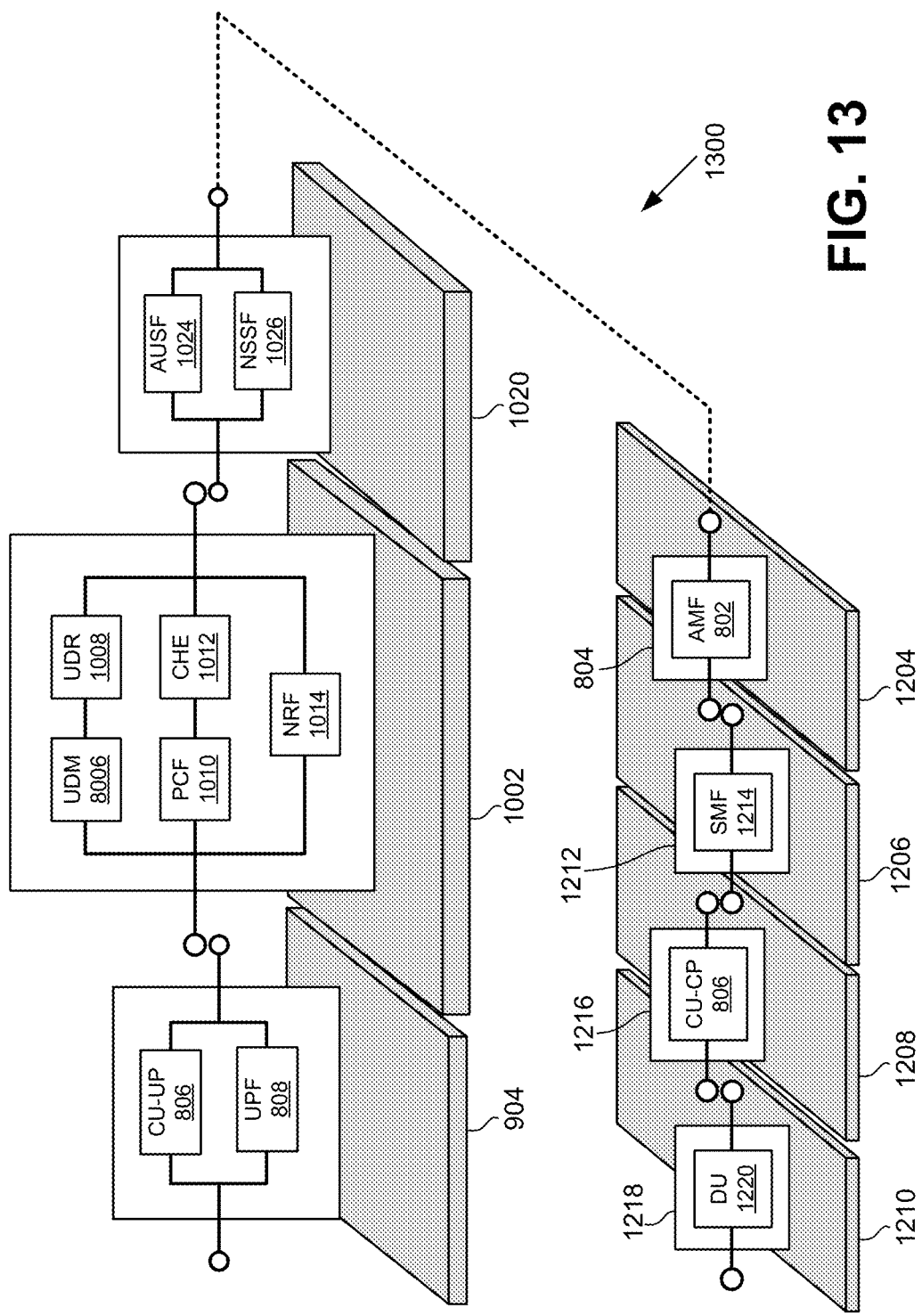

SYSTEMS AND METHODS FOR ZERO-TOUCH DEPLOYMENT OF NETWORK SLICES AND NETWORK SLICE ASSURANCE SERVICES

BACKGROUND INFORMATION

Advanced wireless networks, such as Fifth Generation (5G) networks, have the ability to perform network slicing to increase network efficiency and performance. Network slicing involves a form of virtual network architecture that enables multiple logical networks to be implemented on top of a shared physical network infrastructure using software defined networking (SDN) and/or network function virtualization (NFV). Each logical network, referred to as a "network slice," may encompass an end-to-end virtual network with dedicated storage and/or computational resources that include access networks, clouds, transport, Central Processing Unit (CPU) cycles, memory, etc. Furthermore, each network slice may be configured to meet a different set of requirements and be associated with a particular Quality of Service (QoS) class, type of service, and/or particular enterprise customers associated with mobile communication devices.

BRIEF DESCRIPTION OF THE DRAWINGS

FIGS. 12 and 13 illustrate exemplary implementations of network slices for providing different services.

DETAILED DESCRIPTION OF PREFERRED EMBODIMENTS

The following detailed description refers to the accompanying drawings. The same reference numbers in different drawings may identify the same or similar elements.

Today's network automation framework, such as the Open Network Automation Platform (ONAP), focuses on design templates with standard descriptors. When defining a network, the network designer may be required to manually provide deployment specific inputs for templates. Such a requirement does not enable zero-touch slice deployment for advanced networks (e.g., Fifth Generation (5G) network, Sixth Generation network (6G), etc.). In the above framework, slice planning is deployment and region specific, requiring customized inputs.

The system and methods described herein relate to processing deployment specific information in particular formats, aggregated and stored as profiles (also referred to as descriptors) in design catalogs. A network designer or operator may define a slice and/or Slice Assurance Service (SAS) to generate one or more of the descriptors. When desired, the network operator may request an End-to-End Slice Service (E2E SS) deployment system to instantiate the slice and/or the SAS defined by the descriptors without further intervention on the part of the designer or operator. The system may enable on-demand service offering and automated network adaptation (e.g., network repair).

Figure 1A:
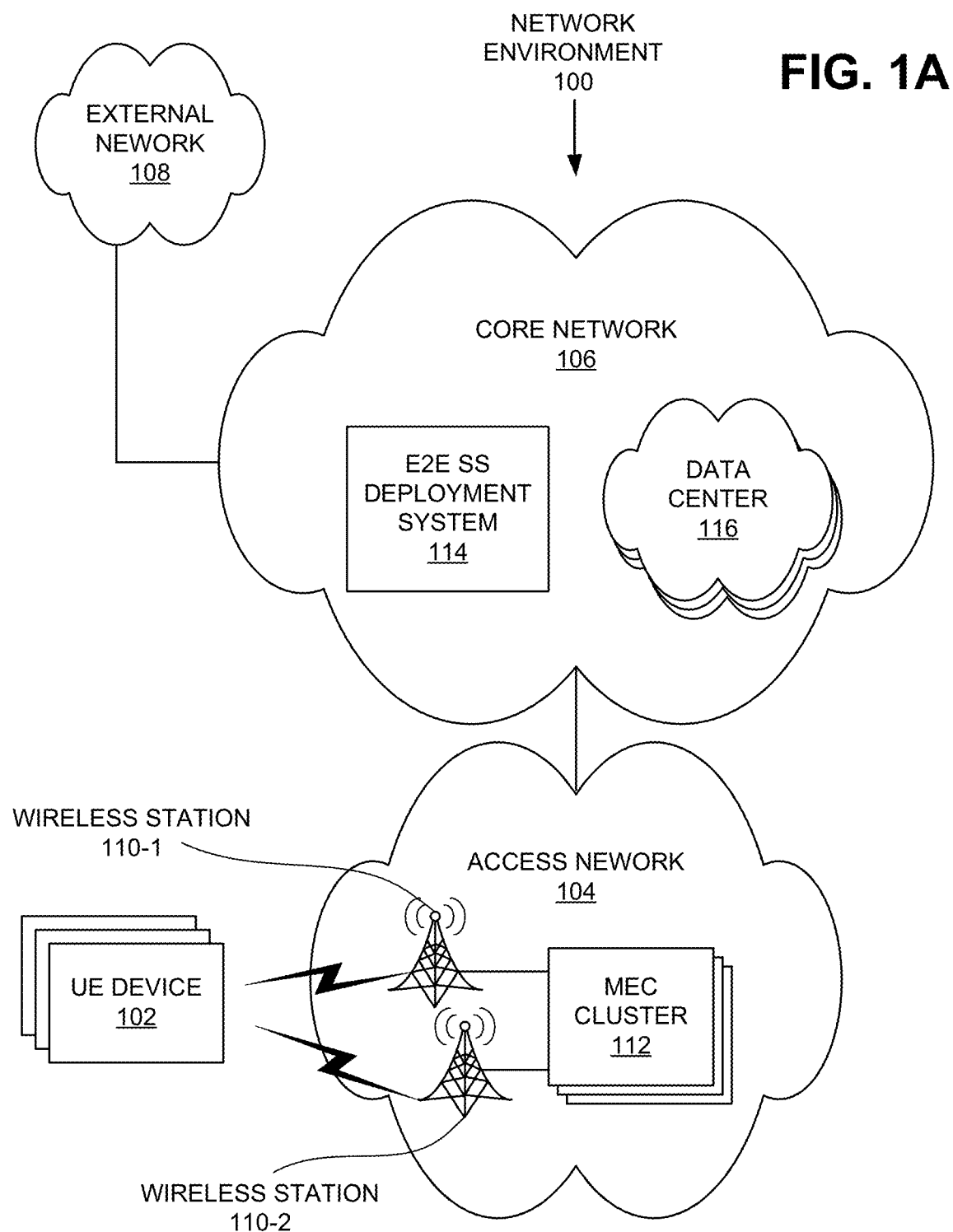
FIG. 1A illustrates an exemplary network environment in which systems and methods described herein may be implemented.
Figure 1B:
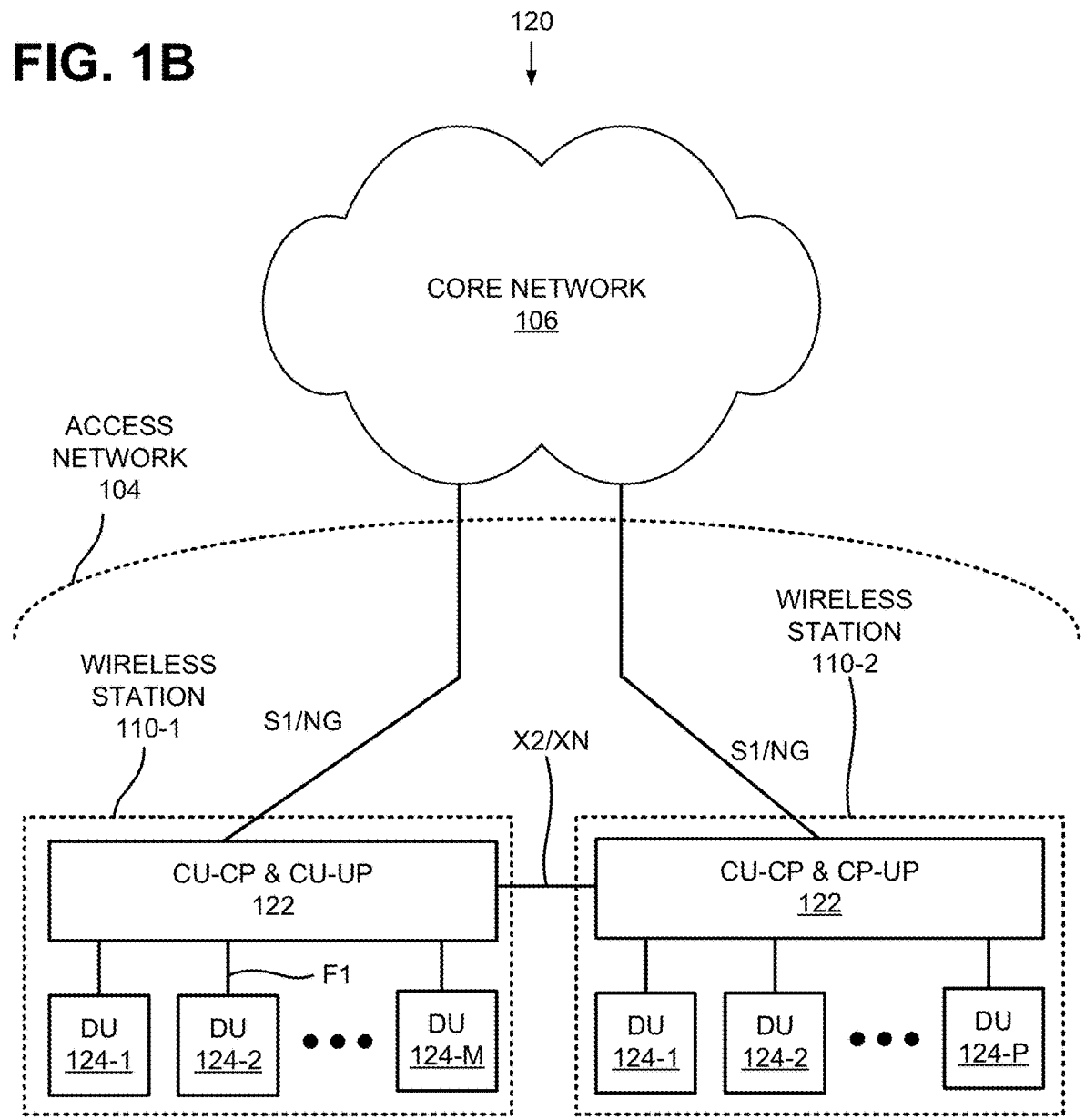
FIG. 1B shows exemplary functional components, in the access network of FIG. 1A, that the End-to-end (E2E) Slice Service (SS) deployment system of FIG. 1A may deploy.
Figure 1C:
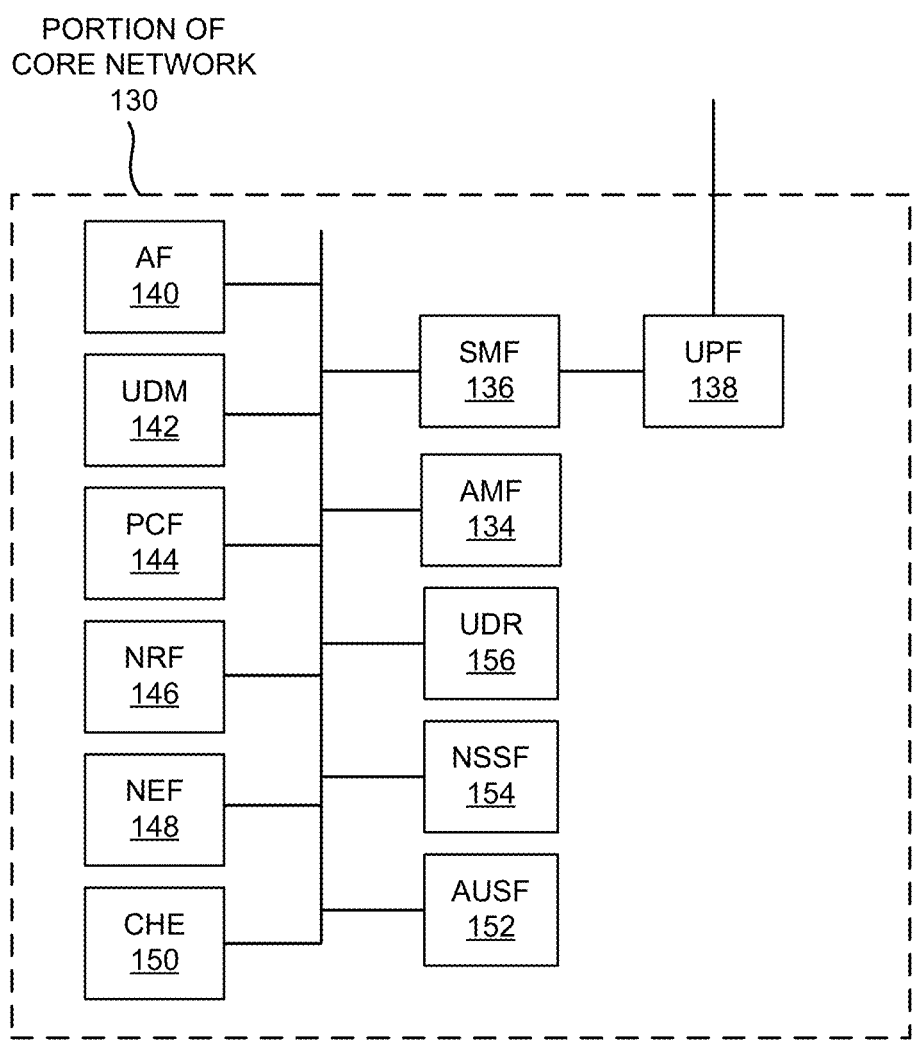
FIG. 1C illustrates exemplary functional components, in the core network of FIG. 1A, that the E2E SS deployment system of FIG. 1A may deploy.

FIG. 1A illustrates an exemplary network environment 100 in which the systems and methods described herein may be implemented. FIGS. 1B and 1C show functional components of portions of network environment 100 in greater detail. Referring to FIG. 1A, environment 100 may include one or more of User Equipment (UE) device 102, access network 104, core network 106, and external network 108.

UE device 102 may include a wireless communication device. Examples of UE device 102 include: a smart phone; a tablet device; a wearable computer device (e.g., a smart watch); a laptop computer; a portable gaming system; and an Internet-of-Thing (IoT) device. In some implementations, UE device 102 may correspond to a wireless Machine-Type-Communication (MTC) device that communicates with other devices over a machine-to-machine (M2M) interface, such as Long-Term-Evolution for Machines (LTE-M) or Category M1 (CAT-M1) devices and Narrow Band (NB)-IoT devices. UE device 102 may send packets over or to access network 104.

Access network 104 may allow UE device 102 to access core network 106. To do so, access network 104 may establish and maintain, with participation from UE device 102, an over-the-air channel with UE device 102; and maintain backhaul channels with core network 106. Access network 104 may convey information through these channels, from UE device 102 to core network 106 and vice versa.

Access network 104 may include a Fourth Generation (4G) radio network, a Fifth Generation (5G) radio network and/or another advanced radio network. These radio networks may include many wireless stations, which are illustrated in FIG. 1A as wireless stations 110-1 and 110-2 (generically referred to as wireless station 110 and collectively as wireless stations 110) for establishing and maintaining an over-the-air channel with UE device 102.

Wireless station 110 may include a 5G, 4G, or another type of wireless station (e.g., evolved Node B (eNB), next generation Node B (gNB), etc.) that includes one or more Radio Frequency (RF) transceivers. Wireless station 110 (also referred to as base station 110) may provide or support one or more of the following: 4 Tx functions (e.g., 4 transceiver antenna function); carrier aggregation functions; advanced or massive multiple-input and multiple-output (MIMO) antenna functions (e.g., 8×8 antenna functions, 16×16 antenna functions, 256×256 antenna functions, etc.);

cooperative MIMO (CO-MIMO) functions; relay stations; Heterogeneous Network (HetNets) of overlapping small cell-related functions; macrocell-related functions; Machine-Type Communications (MTC)-related functions, such as 1.4 MHz wide enhanced MTC (eMTC) channel-related functions (i.e., Cat-M1), Low Power Wide Area (LPWA)-related functions such as Narrow Band (NB) Internet-of-Thing (IoT) (NB-IoT) technology-related functions, and/or other types of MTC technology-related functions; Dual connectivity (DC), and other types of LTE-Advanced (LTE-A) and/or 5G-related functions. In some implementations, wireless station 110 may be part of an evolved UMTS Terrestrial Network (eUTRAN). Wireless station 110 may include Remote Electronic Tilt (RET) capability for beam steering or beam shaping.

As further shown, wireless stations 110 may be coupled to MEC clusters 112 in access network 104. MEC clusters 112 may be located geographically close to wireless stations 110, and therefore also be close to UE devices 102 serviced by access network 204 via wireless station 110. Due to its proximity to UE device 102, MEC cluster 112 may be capable of providing services to UE devices 102 with minimal latency. Depending on the implementations, MEC clusters 112 may provide many core and/or application functions, but at network edges.

Core network 106 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, an LTE network (e.g., a 4G network), a 5G network, an ad hoc network, a telephone network (e.g., the Public Switched Telephone Network (PSTN), an intranet, or a combination of networks. Core network 106 may allow the delivery of communication services (e.g., Internet Protocol (IP) services) to UE device 102, and may interface with other networks, such as external network 108. Depending on the implementation, core network 106 may include 4G core network components (e.g., a Serving Gateway (SGW), a Packet data network Gateway (PGW), a Mobility Management Entity (MME), etc.), 5G core network components, or another type of core network component.

As further shown, core network 106 may include an End-to-End Slice Service (E2E SS) deployment system 114 and data centers 116. E2S SS deployment system 114 may allow network operators to design and deploy network slices and slice assurance services, which are further described below. For designing a network slice or an SAS, system 114 may receive specific information from the network operators in particular formats, aggregate and store the inputs as profiles (also referred to as slice descriptors) in design catalogs. That is, slice descriptors define network slices and/or SASs. When needed, the network operator may request E2S SS deployment system 114 to instantiate the slice/SAS defined by the slice descriptor, without further design intervention.

Data centers 116 may include computer devices (e.g., servers). Although shown as part of core network 106, data centers 114 may also be implemented within external network 108 or MEC clusters 112. The devices of data centers 116 may be arranged as part of network function virtualization infrastructure (NFVI) and/or a cloud computing platform.

External network 108 may include networks that are external to core network 106. In some implementations, external network 108 may include packet data networks, such as an IP network. An IP network may include, for example, an IP Multimedia Subsystem (IMS) network that may provide a Short Messaging Service (SMS), Voice-over-IP (VoIP) service, etc.

In the implementation shown in FIG. 1A, deployment of a network slice and/or a slice assurance service by E2E SS deployment system 114 may entail instantiation of network functions and/or sharing use of software and hardware components in access network 104 and core network 106. More specifically, in exemplary embodiments, E2S SS deployment system 114 may receive, from a network operator, input specifications for deployment of these network components and generate slice descriptors/profiles based on the input. Upon demand from the network operator, E2S SS deployment system 114 may apply the slice descriptors to instantiate the network components and/or share the use of the hardware/software components in access network 104 and core network 106. That is, E2S SS deployment system 114 has the ability to implement, as part of a network slice and/or SAS, some of the components of access network 104 and core network 106. Some of these network functions and hardware/software components that may be instantiated or used (as part of the deployed network slice and/or the SAS) by E2S SS deployment system 114 illustrated as network components in FIGS. 1B and 1C.

FIG. 1B illustrates exemplary functional components, of access network 104 of FIG. 1A, that system 114 may deploy (i.e., instantiate and/or share) as part of a network slice or an SAS, based on service descriptors. Consistent with FIG. 1A, access network 104 includes wireless stations 110-1 and 110-2—other wireless stations that may be part of access network 104 are not shown in FIG. 1A or 1B. Each wireless station 110 includes a central unit-control plane (CU-CP) and central unit user plane (CU-UP) 122, distributed units (DUs) 124-1 through 404-M/P, and one or more Radio Units (RUs). For simplicity, RUs are not shown in FIG. 1B.

CU-CP and CU-UP 122 (collectively CU 122) may process control plane and user plane upper layers of the communication protocol stack for wireless stations 110. For example, assume that wireless station 110-1 is a gNB. Communications at gNB user plane includes, from the lowest layer to the highest layer: a physical (PHY) layer, a Media Access Control layer (MAC) layer, a Radio Link Control (RLC) layer, and a Packet Data Convergence Protocol (PDCP) layer. The control plane communications include the same layers as those in the user plane, and in addition, includes a Radio Resource Control (RRC) layer. CU 122 may not be located physically close to DUs 124, and may be implemented as cloud computing elements, through network function virtualization (NFV) capabilities of the cloud. As shown, CU 122 communicates with the components of core network 106 through S1/NG interface and with other CUs 122 through X2/XN interface.

DUs 124 may process lower layers of the communication protocol stack and may provide support for one or more cells with multiple radio beams. In addition, DUs 124 may handle UE device mobility, from DU to DU, gNB to gNB, cell to cell, beam to beam, etc. DUs 124 may communicate with a CU 122 through F1 interface.

FIG. 1C illustrates exemplary functional components, of core network 106 of FIG. 1A, that system 114 may deploy (i.e., instantiate and/or share) based on service descriptors. In FIG. 1C, a portion 130 of core network 106 is shown as a 5G core network, although other types of core network components are possible. Portion 130 comprises a number of network function (NFs), which include: an Access and Mobility Function (AMF) 134 to perform registration management, connection management, reachability management, mobility management, and/or lawful intercepts; an Session Management Function (SMF) 136 to perform session management, session release, IP address allocation and management, Dynamic Host Configuration Protocol (DHCP) functions, and selection and control of a User Plane Function (UPF) 138; and a UPF 138 to serve as a gateway to packet data network, act as an anchor point, perform packet inspection, routing, and forwarding, perform QoS handling in the user plane, uplink traffic verification, transport level packet marking, downlink packet buffering, and/or other type of user plane functions.

Portion 130 further includes: an Application Function (AF) 140 to provide services associated with a particular application; a Unified Data Management (UDM) 142 to manage subscription information, handle user identification and authentication, and perform access authorization; a Policy Control Function (PCF) 144 to support policies to control network behavior, provide policy rules to control plane functions, access subscription information relevant to policy decisions, and perform policy decisions; a Network Repository Function (NRF) 146 to support service discovery, registration of network function instances, and maintain profiles of available network function instances; a Network Exposure Function (NEF) 148 to expose capabilities and events to other network functions, including third party network functions; a Charging Function (CHF) 150 to perform charging and billing functions; an Authentication Server Function (AUSF) 152 to render authentication services and other security related services to other network components; a Network Slice Selection Function (NSSF) 154 to select a network slice instance to serve a particular UE device 102; a Unified Data Repository (UDR) 156 to provide a repository for subscriber information and other types of information; and/or other types of network functions.

For simplicity, FIGS. 1A-1C do not show all components that may be included in network environment 100 (e.g., routers, bridges, wireless access point, additional networks, additional UE devices, etc.), access network 104, core network 106, and external network 108. That is, depending on the implementation, network environment 100, access network 104, core network 106, and external network 108 may include additional, fewer, different, or a different arrangement of components than those illustrated in FIGS. 1A-1C.

Figure 2:
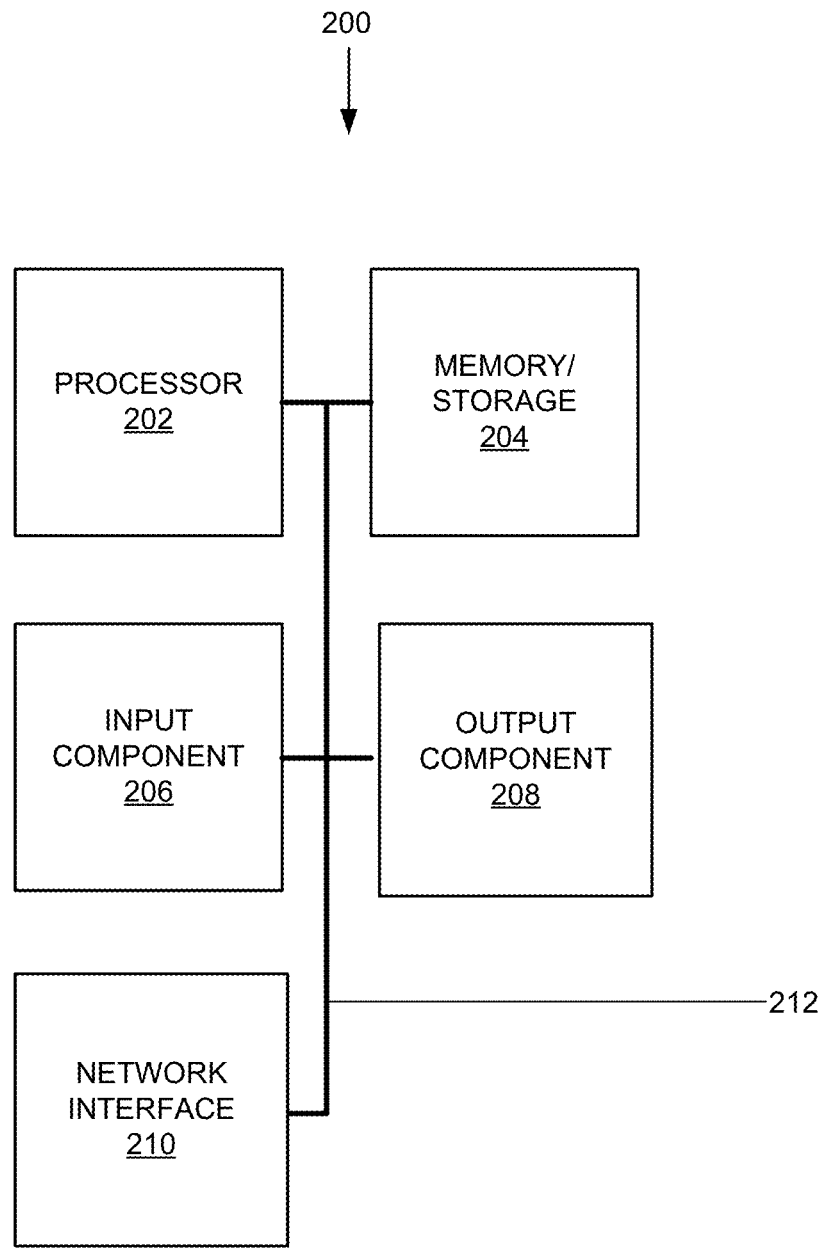
FIG. 2 depicts exemplary components of an exemplary network device of the networks of FIGS. 1A-1C.

FIG. 2 depicts exemplary components of an exemplary network device 200. One or more of network device 200 correspond to, are included in, or provide a hardware platform for implementation of any of the network components of FIG. 1A-1C (e.g., a router, a network switch, servers, gateways, wireless stations 110, UE device 102, etc.). As shown, network device 200 includes a processor 202, memory/storage 204, input component 206, output component 208, network interface 210, and communication path 212. In different implementations, network device 200 may include additional, fewer, different, or a different arrangement of components than the ones illustrated in FIG. 2. For example, network device 200 may include a display, network card, etc.

Processor 202 may include a processor, a microprocessor, an Application Specific Integrated Circuit (ASIC), a Field Programmable Gate Array (FPGA), a programmable logic device, a chipset, an application specific instruction-set processor (ASIP), a system-on-chip (SoC), a central processing unit (CPU) (e.g., one or multiple cores), a microcontrollers, and/or another processing logic device (e.g., embedded device) capable of controlling device 200 and/or executing programs/instructions.

Memory/storage 204 may include static memory, such as read only memory (ROM), and/or dynamic memory, such as random access memory (RAM), or onboard cache, for storing data and machine-readable instructions (e.g., programs, scripts, etc.).

Memory/storage 204 may also include a floppy disk, CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 204 may be external to and/or removable from network device 200. Memory/storage 204 may include, for example, a Universal Serial Bus (USB) memory stick, a dongle, a hard disk, off-line storage, a Blu-Ray® disk (BD), etc. Memory/storage 204 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 206 and output component 208 may provide input and output from/to a user to/from device 200. Input and output components 206 and 208 may include, for example, a display screen, a keyboard, a mouse, a speaker, actuators, sensors, gyroscope, accelerometer, a microphone, a camera, a DVD reader, Universal Serial Bus (USB) lines, and/or other types of components for obtaining, from physical events or phenomena, to and/or from signals that pertain to device 200.

Network interface 210 may include a transceiver (e.g., a transmitter and a receiver) for network device 200 to communicate with other devices and/or systems. For example, via network interface 210, network device 200 may communicate with wireless station 110.

Network interface 210 may include an Ethernet interface to a LAN, and/or an interface/connection for connecting device 200 to other devices (e.g., a Bluetooth interface). For example, network interface 210 may include a wireless modem for modulation and demodulation.

Communication path 212 may enable components of network device 200 to communicate with one another.

Network device 200 may perform the operations described herein in response to processor 202 executing software instructions stored in a non-transient computer-readable medium, such as memory/storage 204. The software instructions may be read into memory/storage 204 from another computer-readable medium or from another device via network interface 210. The software instructions stored in memory or storage (e.g., memory/storage 204, when executed by processor 202, may cause processor 202 to perform processes that are described herein.

Figure 3:
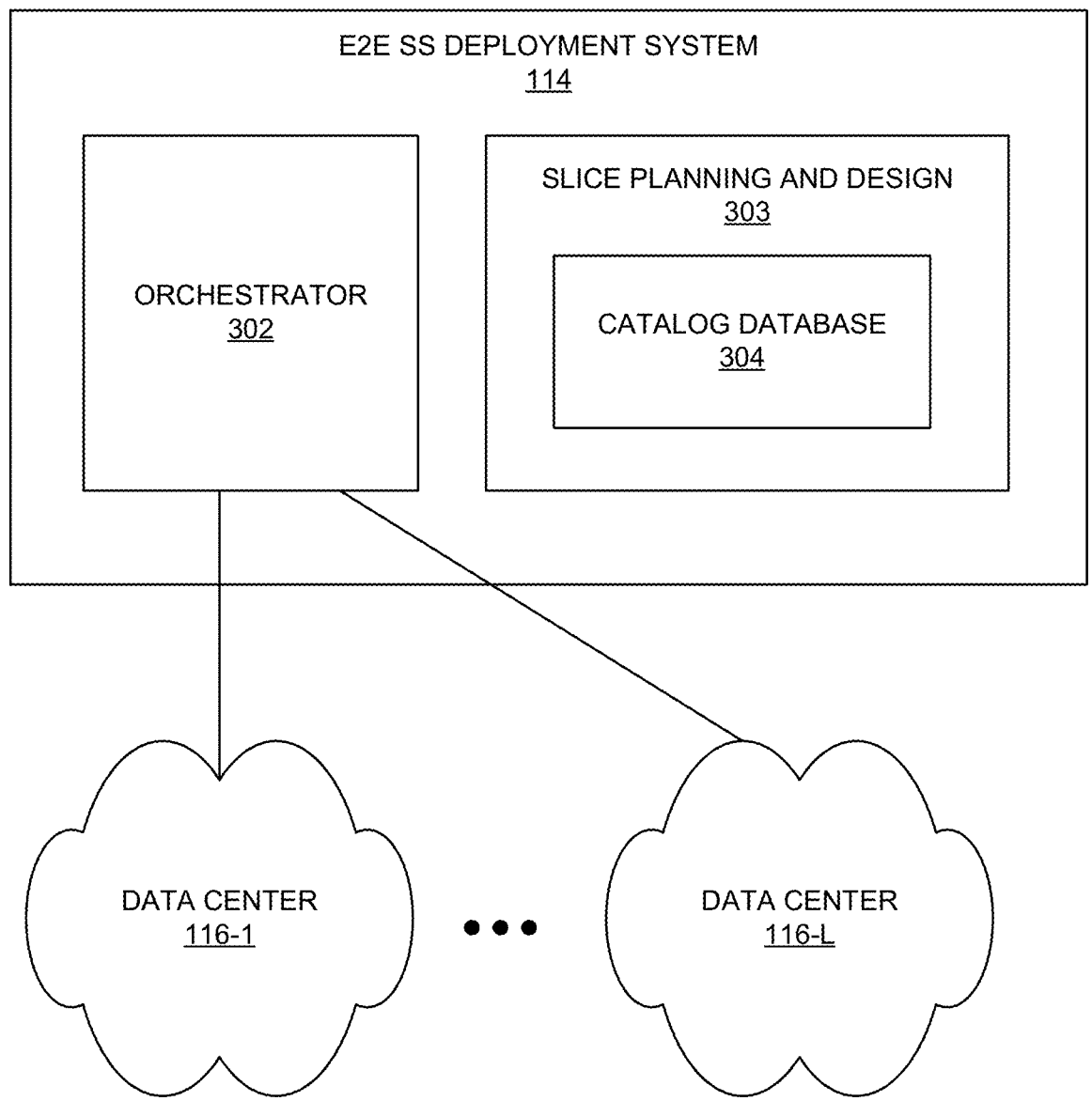
FIG. 3 illustrates exemplary logical components of the E2S SS deployment system of FIG. 1A according to one implementation.

FIG. 3 illustrates exemplary logical components of E2S SS deployment system 114 of FIG. 1A according to one implementation. As shown, E2S SS deployment system 114 includes an orchestrator 302 and a Slice Planning and Design system 303 (also referred to as Design system 303), which in turn includes a design catalog database 304. Design system 303 may include software components for network operators to create, edit, delete, and store network slice and/or SAS designs. When design system 303 creates, edits, or deletes a slice and/or SAS design, system 303 receives network operator input related to service descriptors that define a network slice and/or SAS. Design system 303 organizes profiles that it has created as design catalogs, and stores in them in design catalog database 304. When a network operator requests E2S SS deployment system 114 to implement a service/slice and/or SAS, system 114 retrieves the descriptor, parses the descriptor, and implements the service/slice and/or SAS in one or more of data centers 116-1 through 116-L. System 114 may also recruit network components not necessarily in data centers 116 but in access network 104, such as those described above in relation to FIG. 1B. These components are not illustrated in FIG. 3.

Figure 4:
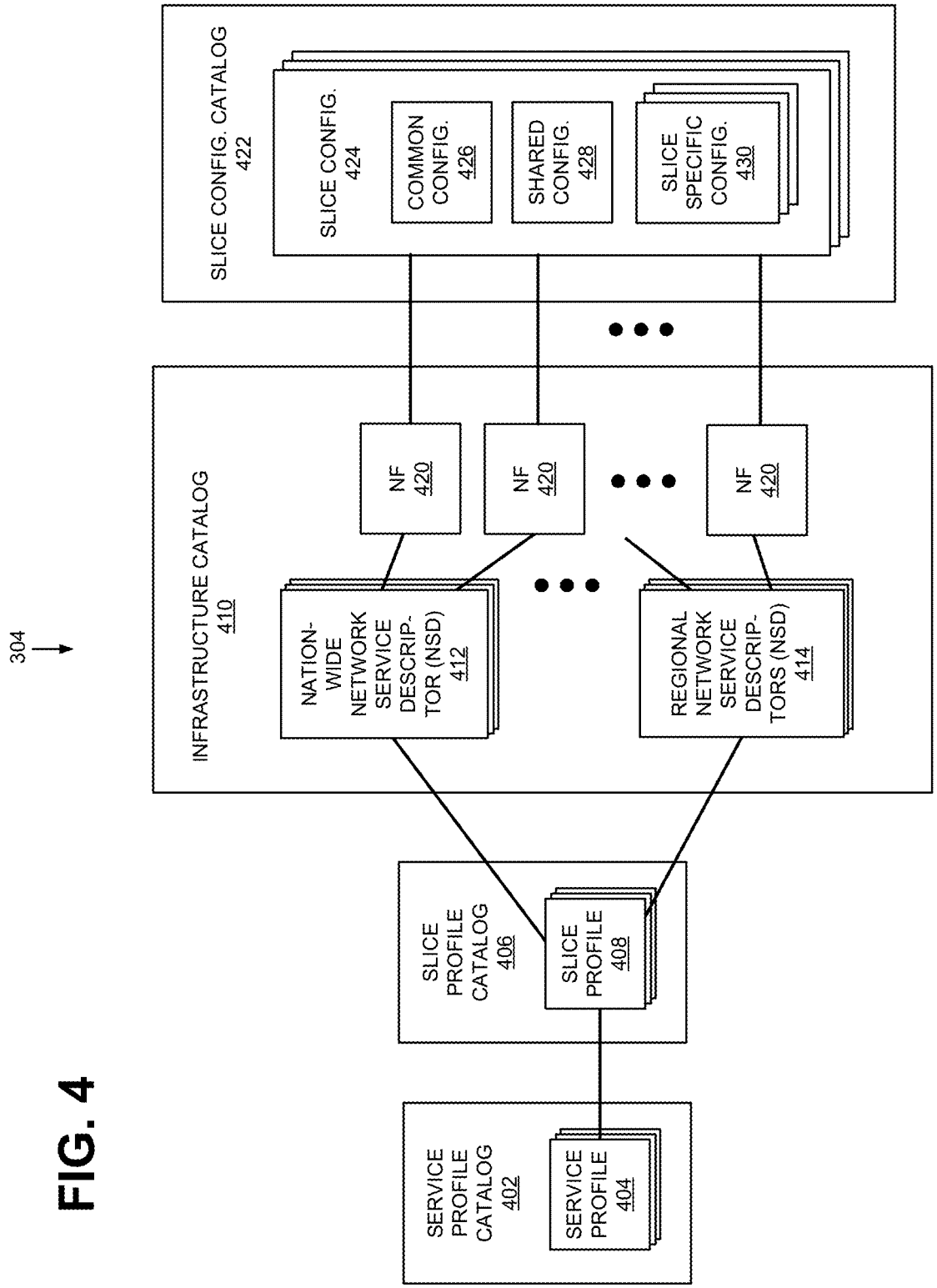
FIG. 4 illustrates exemplary design catalogs and other data stored in the catalog database of FIG. 3, according to one implementation.

FIG. 4 illustrates exemplary design catalogs and other data stored in design catalog database 304 of FIG. 3, according to one implementation. As shown, design catalog database 304 may include a service profile catalog 402, a slice profile catalog 406, an infrastructure catalog 410, and a slice configuration catalog 422. Although not illustrated, design catalog database 304 may include additional or fewer catalogs or other types of data. Furthermore, in other implementations, each of the catalogs may include profiles different from those illustrated in FIG. 3.

Service profile catalog 402 comprises a set of service profiles 404 that define characteristics of network services. Each service profile 404 references one or more slice profiles 408, to be described below. A service profile also describes service requirements, such as Service Level Agreements (SLAs).

Slice profile catalog 406 comprises a set of slice profiles 408 that define characteristics of network slices. Each slice profile 408 may reference a set of infrastructure profiles. Slice profile catalog 406 may also include slice type profiles (not shown), where each slice type profile describes a type of slice—i.e. network characteristics common across slices of the same type, such as an enhanced Mobile Broadband (EMBB) type, a Low Latency Communications (LLC) type, or a Ultra Reliable LLC (URLLC) type, a massive Machine Type Communications (MMTC) type, etc.

Infrastructure catalog 410 comprises nationwide network service descriptors (NSDs) 412 and regional NSDs 414. Each of NSDs 412 and 414 specifies one or more interconnected network functions (NFs) 420. Each NF 420 of FIG. 4, when deployed, may be instantiated as one of the network functions illustrated in FIG. 1C, such as AMF 134, SMF 136, etc. Nationwide and regional NSDs 412 and 414 are further described below with reference to FIGS. 9A-10B.

Slice configuration catalog 422 comprises a collection of slice configurations 424. Each NF 420 may support a set of slices, and hence, may reference a slice configuration 424. Slice configuration 424 defines a set of configuration models—specifically a common configuration 426, a shared configuration 428, and a slice specific configuration 430. In some implementations, each of configurations 428-430 includes key-value pairs.

Common configuration 426 specifies configuration parameters for NF 420 that are slice agnostic (i.e., independent of the requirements of a particular slice). Shared configuration 428 specifies configuration parameters, for an NF 420 supporting multiple slices, which are shared by the slices. Shared configuration 428 may change when a reference to a slice is added or removed from an NF 420. Each of slice specific configurations 430 includes configuration parameters that are only used for a single slice. These parameters do not have effect on NF 420 for other slices. As shown in FIG. 4, each slice configuration 424 may include multiple slice specific configurations 430.

Figure 5:
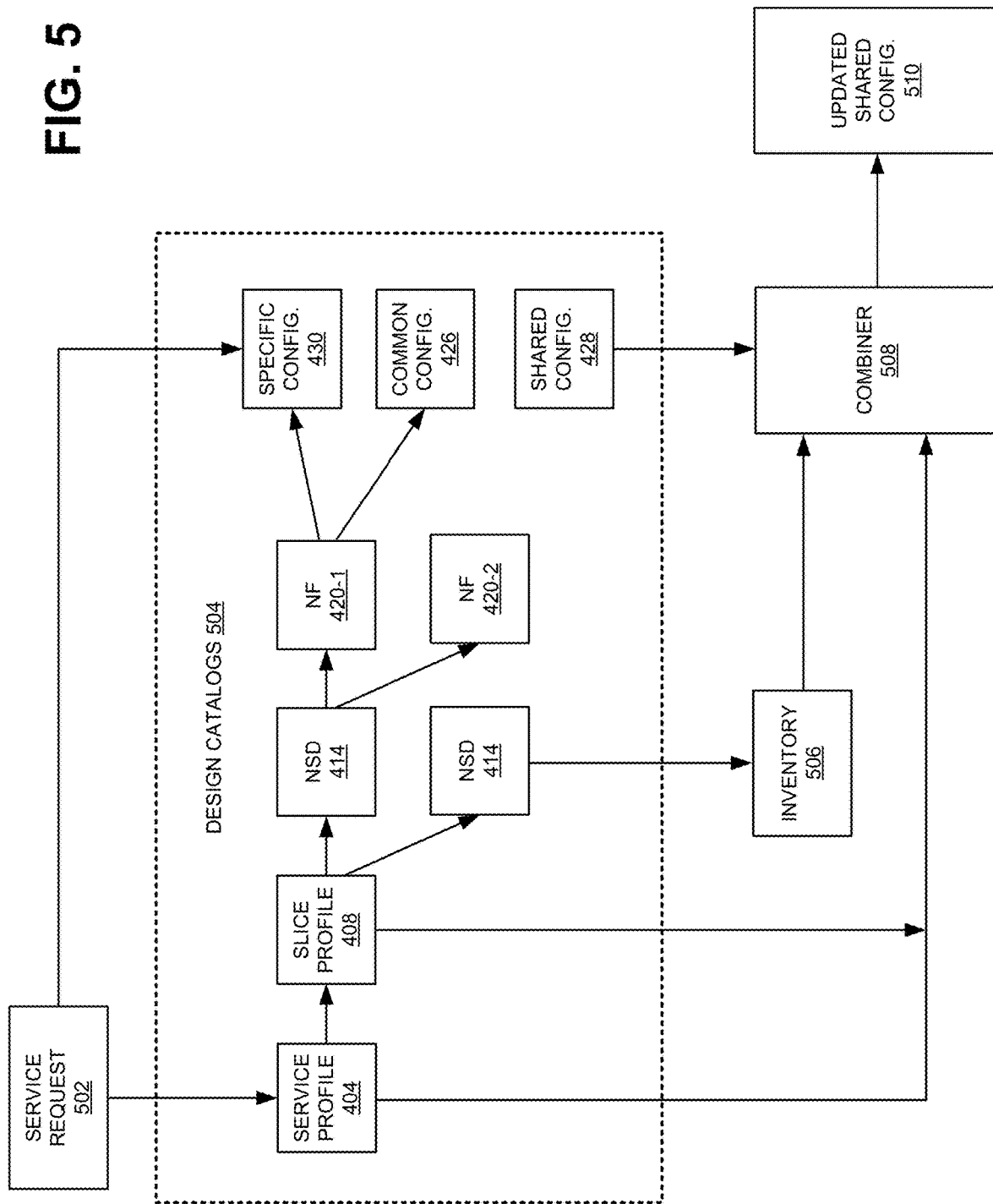
FIG. 5 illustrates exemplary processing of various profiles of FIG. 4 by the orchestrator of FIG. 3, according to one implementation.

FIG. 5 illustrates exemplary processing of various profiles of FIG. 4 by orchestrator 302 of FIG. 3, according to one implementation. Depending on the implementation, orchestrator 302 may process additional, fewer, or different profiles than those illustrated in FIG. 5. Furthermore, orchestrator 302 may perform additional, fewer, and/or different operations than those described below. For FIG. 5, assume that the profiles are in various design catalogs 504, which exist catalog database 304.

When orchestrator 302 receives a service request 502, orchestrator 302 extracts a slice identifier (ID) and a location ID (or location information) from the request 502. Orchestrator 302 then locates a service profile 404 in service catalog 402 and parses the service profile 404. By parsing the service profile 404, orchestrator 302 identifies references to slice profiles 408, and access the referenced slice profiles 408 in slice catalog 406. Orchestrator 302 parses slice profiles 408 to access the network slice descriptors (NSD) 412/414 (also called infrastructure profiles 412/414).

By parsing the NSD 412/414, orchestrator 302 obtains references to NFs 420 and a slice configuration 424. Additionally, orchestrator 302 selects a slice specific configuration 430 from multiple slice specific configurations 430 based on the slice ID that orchestrator 302 has extracted from request 502.

When processing shared configuration 428, orchestrator 302 views the shared key-values pairs, of the shared configuration parameters for the shared slices, and retrieves from an inventory 506 all slices (e.g., N slices) currently using the infrastructure specified by the NSD 420. The shared configuration 428 reflects the N slices supported by the NF 420.

When processing shared configuration 428, orchestrator 302 consults a combiner 508, which combines a shared configuration from a new slice with the current shared configuration 428 to produce an updated shared configuration 510 for the NF 420. When the new slice is deployed, orchestrator 302 updates inventory 506 with slices currently using the NSD 414 with the updated shared configuration 510. For automated closed loop network repair, the catalogs in database 304 can be used to deploy alternative infrastructure and configurations associated NFs 420.

Combiner 508 may apply one of many methods for combining shared configurations 428. According to some implementations, combiner 508 may use a rule-based approach. In such implementations, combiner 508 includes rules, one per each of the attributes of the shared configuration 428, on how to combine. For example, a rule may require combiner 508 to: select the maximum of an attribute across different slices sharing an NF 420; select the minimum; or select the arithmetic average. Combiner 508 may also scan service and slice profiles corresponding to the slices sharing the same NF 420 to determine certain attributes (e.g. inter-slice priority) and use such attributes in applying its combining rules. In other rule-based implementations, combiner 508 may use machine learning (ML)-based methods to optimize (e.g., select the best key-value pairs), given a large number of inputs and constraints.

In some implementations, combiner 508 may apply an exhaustive approach for combining shared configurations 428. For the exhaustive approach, slice configuration catalog 422 includes an exhaustive set of key-value pairs for shared configuration attributes for every combination of slices that may share an NF 420. For example, the combinations for 3 slices S1, S2, and S3 are S1+S2, S1+S3, S2+S3, and S1+S2+S3. Slice configuration catalog 422 would include a slice configuration 424 for each of the combinations. The exhaustive approach may become cumbersome to apply when the number of slices become large.

In still other implementations, combiner 508 may apply a mix of the rule-based and exhaustive combining approaches. For example, some shared configuration attributes may be suitable for rule-based combining, while other shared configuration attributes may require the exhaustive approach.

Figure 6:
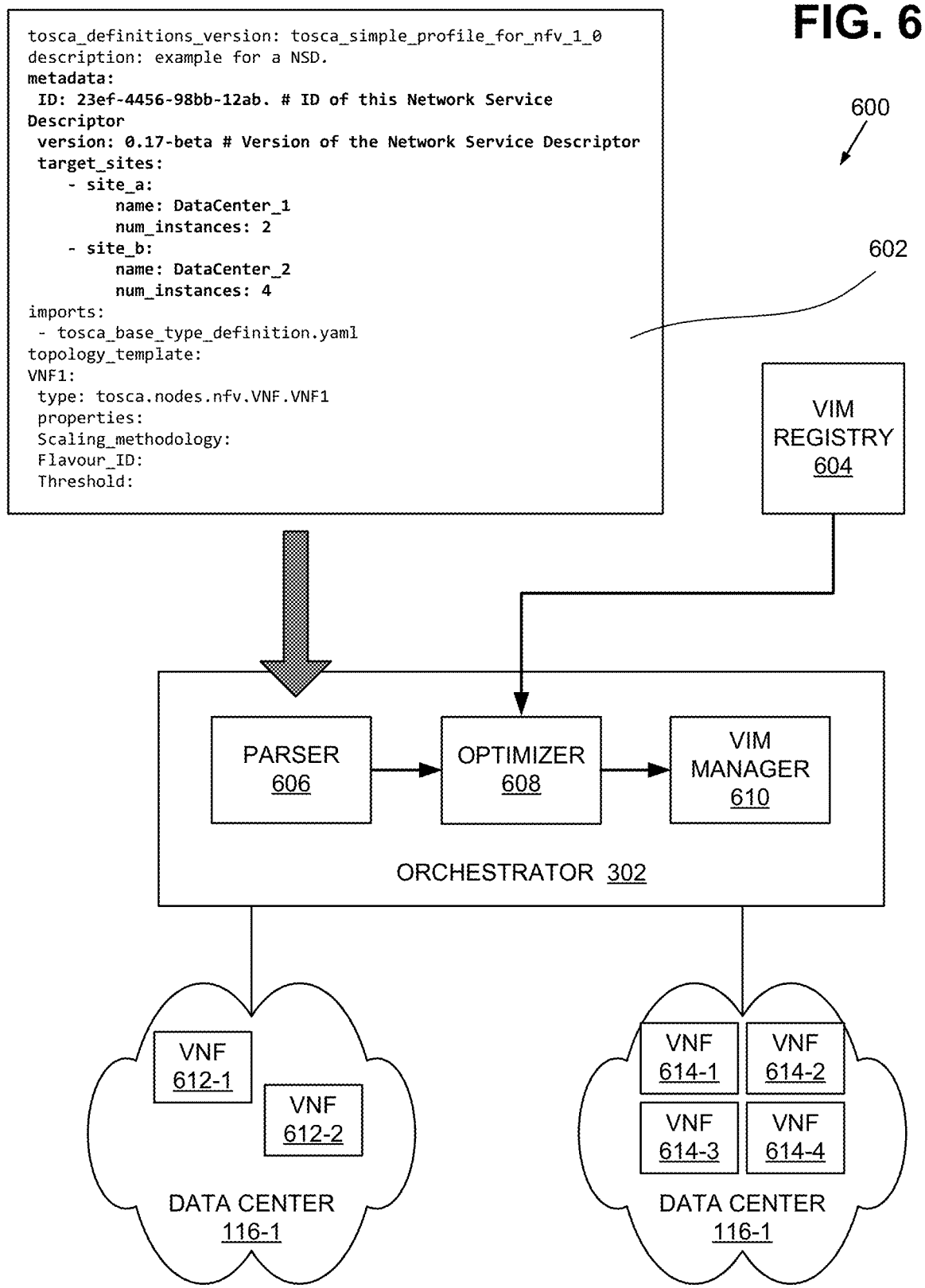
FIG. 6 illustrates exemplary detailed processing, by the orchestrator of FIG. 3, of a service descriptor, according to one implementation.

FIG. 6 illustrates exemplary detailed processing, by orchestrator 302 of FIG. 3, of a service descriptor, according to one implementation. Processing environment 600 includes network service descriptor 602 (i.e., NSD 412/414), orchestrator 302, a virtual infrastructure manager (VIM) registry 604, and data centers 116-1 and 116-2. Depending on the implementation, processing environment 600 may include additional, fewer, different, or a different arrangement of components than those illustrated in FIG. 6.

As described above in relation to FIG. 4, network service descriptor 602 includes key-value pairs. In some implementations, network service descriptor 602 may be written in a YAML Ain't Markup Language (YAML). In FIG. 6, network service descriptor 602 is shown as written in the Topology and Orchestration Specification for Cloud Applications (TOSCA) language, which is a dialect of YAML.

In the implementation shown, the metadata portion (the text shown in bold) of TOSCA descriptor 602 is used to achieve a deployment specific design while maintaining the re-usability of infrastructure designs. TOSCA descriptor 602 is backward compatible to existing standards, even though descriptor 602 indicates per-area customization in its metadata.

Orchestrator 302 comprises a parser 606 for reading descriptors, an optimizer 608 for optimizing the design defined by the descriptors, and a Virtual Infrastructure Manager (VIM) manager 610 for instantiating the optimized slice design. VIM registry 604 may include location information associated with each VIM at different network portions (e.g., data center 116).

When parser 606 parses networks service descriptor 602, information in the metadata portion is treated as an override for the corresponding runtime implementation. Parser 602 thus applies site specific customization specified in the metadata portion automatically without the need for manual intervention. Some of the typical site specific information that can be encoded in the metadata for automated slice deployment include: a target VIM, number of NF instances, choice of environment settings, etc. For example, in FIG. 6, the metadata specifies, for site_a, the target VIM as "DataCenter_1" and the number of instances for the NF as 2, and for site_b, the target VIM as "DataCenter_2" and the number of instances as 4.

When in operation, parser 606 parses network service descriptor 602 including the metadata, and passes the names of site_a and site_b to optimizer 608. Optimizer 608 uses the names to locate the sites by looking up the location information in VIM registry 604. Both the location information and the number of NF instances for the corresponding VIM are passed to VIM manager 610, which then uses the information to instantiate 2 NFs in data center 116-1 and 4 NFs in data center 116-2, as part of slice deployment.

Figure 7:
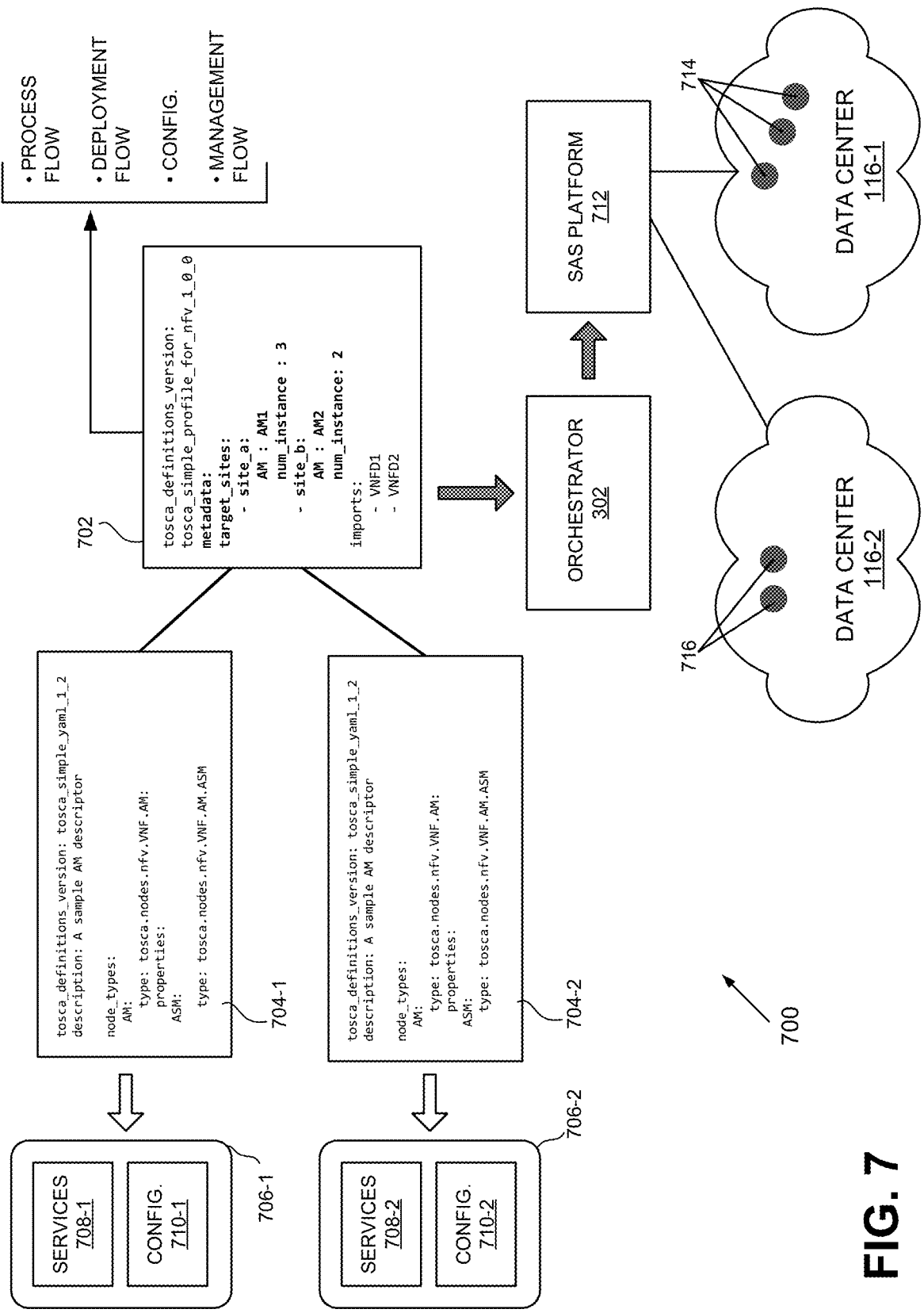
FIG. 7 illustrates exemplary processing, by the orchestrator of FIG. 3, of an exemplary Slice Assurance Service (SAS) descriptor according to one implementation.

FIG. 7 illustrates exemplary processing, by orchestrator 302 of FIG. 3, of an exemplary Slice Assurance Service (SAS) descriptor according to one implementation. Process environment 700 in FIG. 7 includes a SAS descriptor (network service descriptor) 702, a virtual network function descriptor (VNFD) 704-1, a VNFD 704-2, orchestrator 302, an SAS platform 712, and data centers 116-1 and 116-2. Depending on the implementation, process environment 700 may include additional, fewer, and/or different components than those illustrated in FIG. 7.

SAS descriptor 702 may define a slice assurance service, similarly as NSD 412/414. A SAS is a combination of one or more assurance modules (AMs) designed per slice type and can be instantiated per slice instance of slice type. SAS descriptor 702 defines an SAS by references to one or more VNFDs, each of which defines an assurance module. In FIG. 7, SAS descriptor 702 refers to VNFD 704-1 and VNFD 704-2. VNFD 704-1 and VNFD 704-2 correspond to an AM 706-1 and an AM 706-2. Each AM is a combination of assurance micro-services along with configuration for the micro-services. A micro-service, as used herein, refers to tasks for verifying that a slice is performing in accordance with a particular set of requirements (e.g., latency requirements, bandwidth requirements, etc.). Configuration is provisioned per instance during AM instantiation. In FIG. 7, AM 706-1 includes micro-services 708-1 and configuration 710-1, and AM 706-2 includes micro-services 708-2 and configuration 710-2.

In operation, orchestrator 302 parses SAS descriptor 702 to obtain the VNFDs 704-1 and 704-2 that define the SAS and AMs and uses SAS platform 712 to deploy the SAS and the AMs at the network edge, core, far-edge locations, in a manner similar for orchestrator 302 to deploy network slices.

In the example of FIG. 7, SAS descriptor 702 specifies 3 instances of AM1 at site_a and 2 instances of AM2 at site_b. AM1 and AM2 are defined by VNFD 704-1 and VNFD 704-2, respectively. Orchestrator 302 then creates 3 instances of AM1 at data center 116-1 ("site_a") and 2 instances of AM2 at data center 116-2 ("site_b").

As indicated above, E2S SS deployment system 114 may allow a network operator to define various network services and store these definitions in the form of profiles/descriptors. Each NSD can define a network service in terms of other NSDs, and this permits a network operator to define a complex NSD (which defines a complex network slice) in terms of other, more basic NSDs (which define more basic network services). Different types of NSDs, from the lowest level to the highest level of abstraction include: an atomic service, a regional and nation-wide service, and infrastructure service.

An atomic service is the most fundamental network service building block that can be used in defining more complex network services in the context of E2S SS deployment system 114. A NSD descriptor for an atomic service wraps an NF or a set of NFs to be used together as a fundamental building block for other NSDs.

Figure 8A:
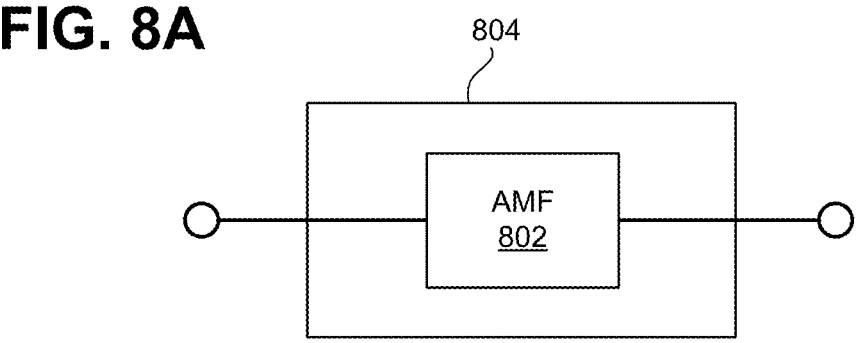
FIGS. 8A and 8B illustrate exemplary atomic services.
Figure 8B:
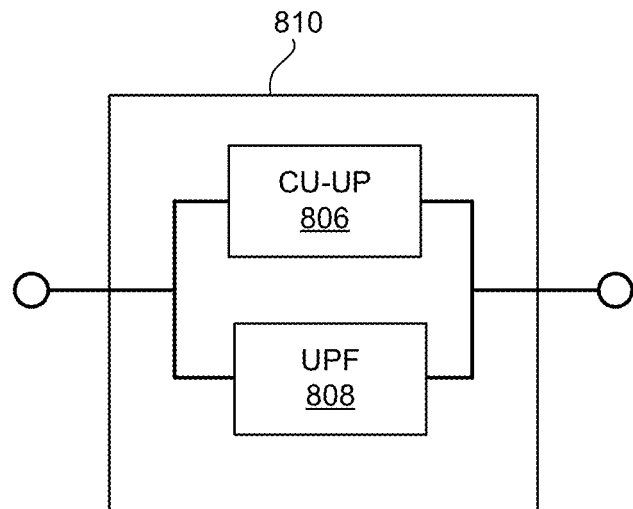

FIGS. 8A and 8B illustrate exemplary atomic services. In FIG. 8A, AMF 802 is defined (within an NSD—not shown) as an atomic service 804. In FIG. 8B, CU-UP 806 and UPF 808 are connected to form an atomic service 810. The NSD for atomic service 810 may be suited for a specific region and may be treated as a unit for efficient life cycle management (LCM). In other words, a single, unified LCM may be applied to NFs grouped into an atomic service, thus allowing the group of NFs to be treated as a logical unit with common lifecycle management. Atomic services promote plug-and-play—the ability to construct more complex services using atomic services as building blocks.

A regional service is obtained by wrapping atomic services and configuring it for a region (e.g., a service that is specific to a region or an area). Such regional service (as defined by an NSD) may be deployed at edges of a network (e.g., access network 104) in a distributed fashion, as network slice subnet instances. By using NSDs that correspond to regional services, E2S SS deployment system 114 can meet growth scenarios (i.e., regional specific growth). In addition, by leveraging regional-service NSDs, customization can easily be made to the NSDs to tune performance for high availability or location (e.g., geographical area) dependent services.

Figure 9A:
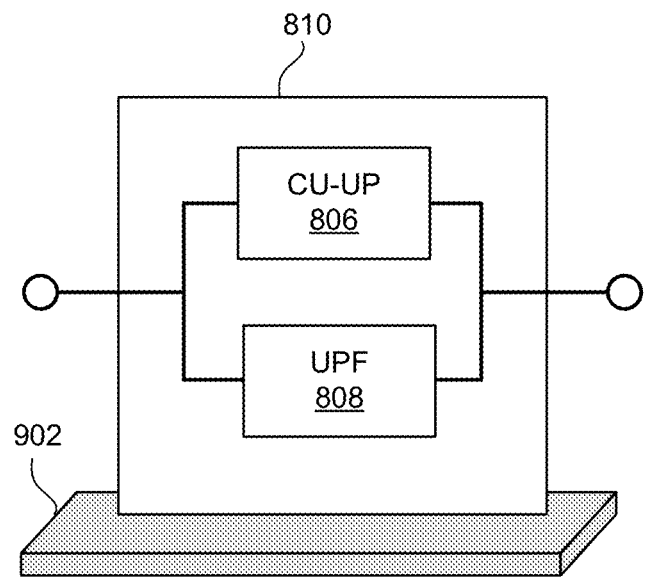
FIGS. 9A and 9B illustrate exemplary regional services.
Figure 9B:
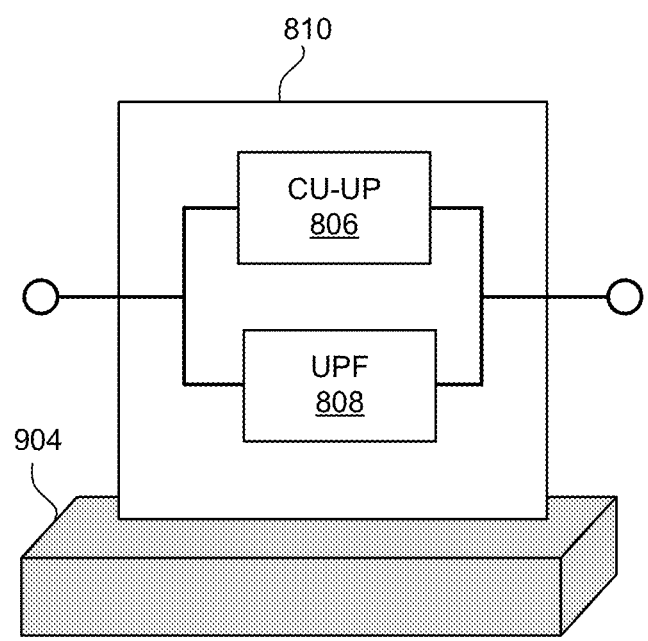

FIGS. 9A and 9B illustrate exemplary regional services. In FIG. 9A, an NSD defines an edge service 902, by wrapping the atomic service 810 (i.e., the combination of CU-UP 806 and UPF 808) as a unit for a region at the edge of networks 104 and 106. In FIG. 9B, an NSD defines a far edge service 902, by wrapping the atomic service 810 as a unit for a region at the far edge of network 104 and 106. Configurations for regional services 902 and 904 may be different from one another, although they both employ the same atomic service.

A nation-wide service is obtained by wrapping atomic services and configuring it for nationwide use (e.g., a service that can be shared and is common to higher services). A national service may be deployed in a core network, in a centralized fashion, as network slice subnet instances. NSDs that define nationwide services enable growth scenarios as well as partitioning of services based on multiples attributes associated with the slice. Examples of attributes for the partitioning include: failure domains, an indication of whether the service is shared or dedicated, an indication of whether the service is centralized of distributed, etc.

Figure 10A:
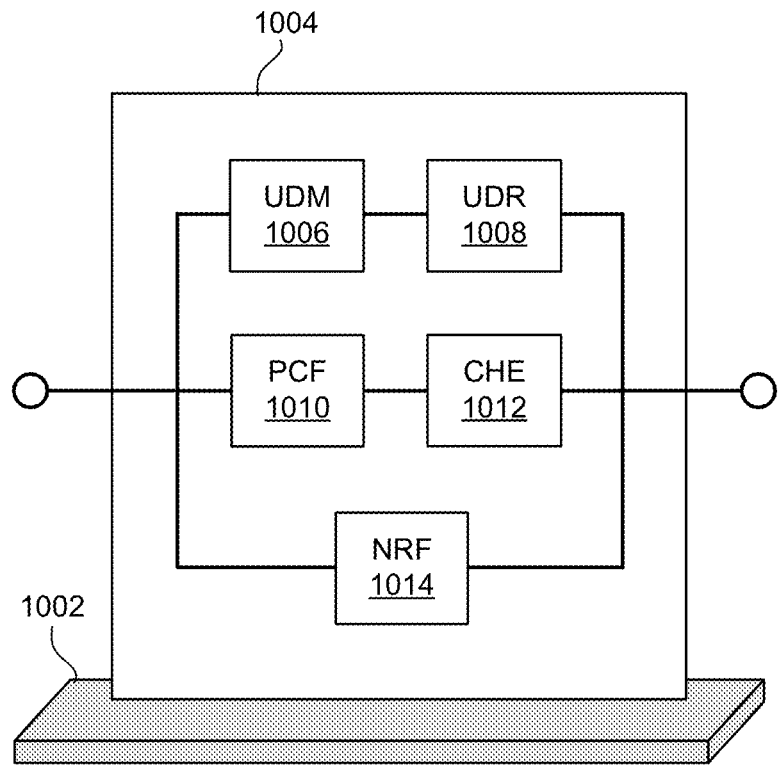
FIGS. 10A and 10B illustrate exemplary national services.
Figure 10B:
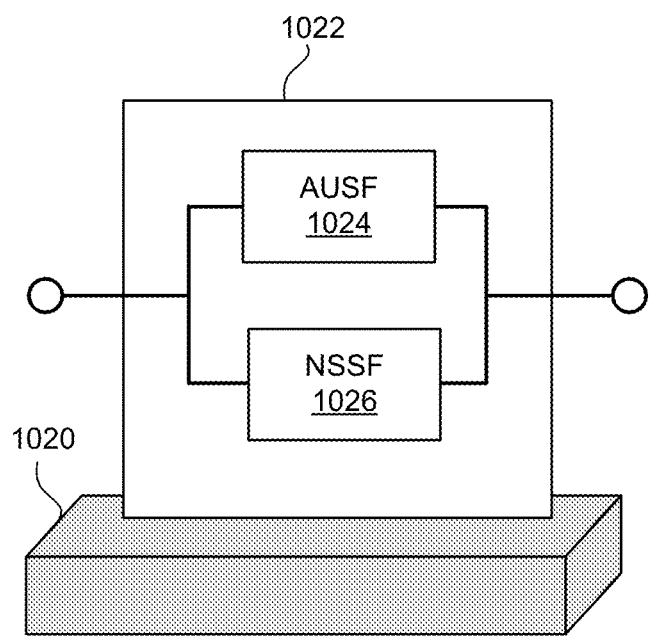

FIGS. 10A and 10B illustrate exemplary national services. In FIG. 10A, a nationwide service 1002 is defined by wrapping UDM 1006, UDR 1008, PCF 1010, CHE 1012, and NRF 1014 into a unit 1004 and configuring unit 1004 as a nationwide service. In FIG. 10B, a nation-wide service 1020 is defined by wrapping AUSF 1024 and NSSF 1026 into a unit 1022 and configuring unit 1022 as a nationwide service.

An infrastructure service (also referred to as a Slice Infrastructure Service (SIS)) comprises regional services and nationwide services that are chained together, as an end-to-end (E2E) service. An infrastructure service, thus, comprises multiple slices (logical networks) across core networks, edge networks, and far-edge networks. The ability for E2S SS deployment system 114 to implement an SIS gives the system a high level control of multiple lower-level components and enables mapping of a slice profile to set of infrastructure and configurations.

Figure 11A:
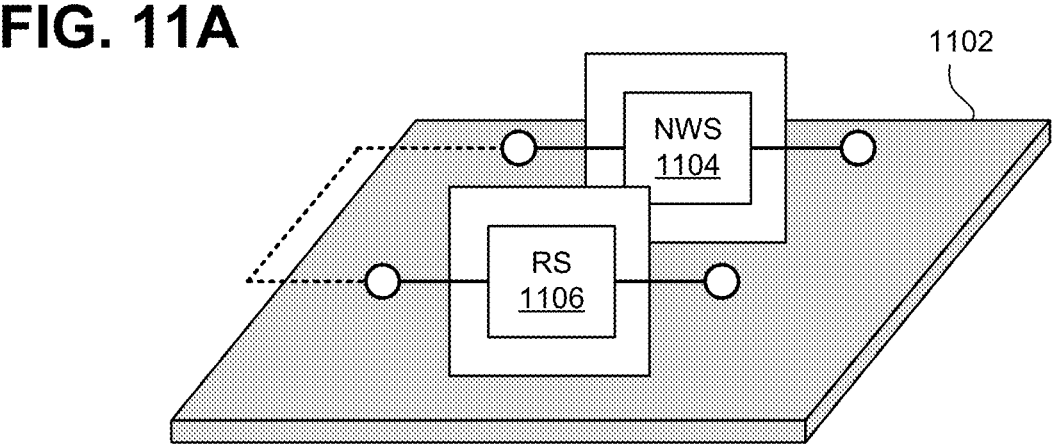
FIGS. 11A and 11B illustrate exemplary slice infrastructure services.
Figure 11B:
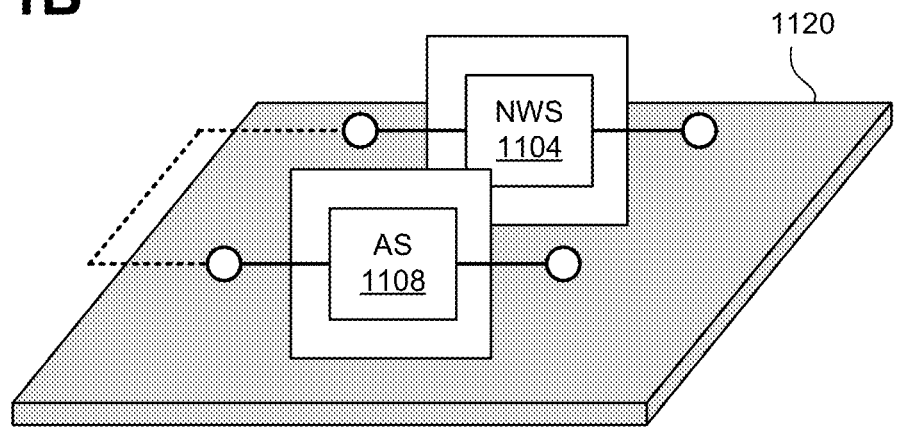

FIGS. 11A and 11B illustrate exemplary slice infrastructure services. In FIG. 11A, a SIS 1102 comprises a combination of a Nationwide Service (NWS) 1104 and a Regional Service (RS) 1106. In FIG. 11B, a SIS 1104 comprises a combination of NWS 1104 and an atomic service (AS) 1108. Both SIS 1104 and 1104 illustrate part of an Enhanced Mobile Broadband (EMBB) service.

Figure 12:
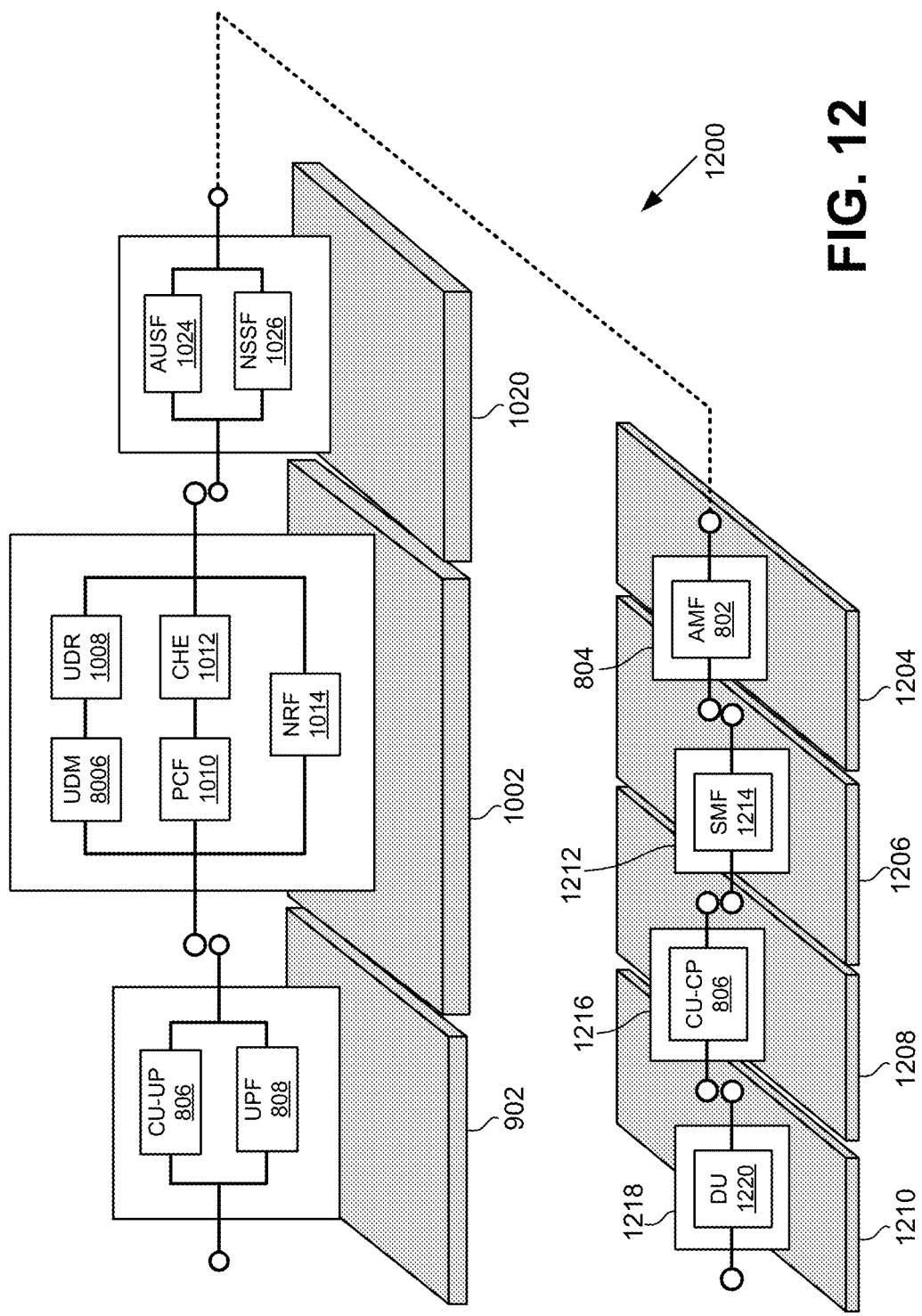

FIG. 12 illustrates an exemplary implementation of network slices 1200 for providing an enhanced Mobile Broadband (EMBB) service. As shown, slices 1200 include regional service 902, nation-wide services 1002, 1020, 1204, 1206, and regional services 1208 and 1210 that are chained in sequence. Services 902, 1002, and 1020 have been described above with reference to FIGS. 9A-10B. Service 1204 includes atomic service 804 wrapped as a nation-wide service. Service 1206 includes SMF 1214-based atomic service 1212 wrapped as a nation-wide service; Service 1208 includes CU-CP 806-based atomic service 1216 wrapped as a regional service (e.g., edge service); and Service 1210 includes DU 1220-based atomic service 1218 wrapped as a regional service (e.g., far-edge service).

FIG. 13 illustrates an exemplary implementation of network slices 1300 for providing a low latency communication (LLC) service. As shown, slices 1200 include regional service 904, nation-wide services 1002, 1020, 1204, 1206, and regional services 1208 and 1210 that are chained in sequence. These services have been described with reference to FIG. 9B and FIG. 12.

In this specification, various preferred embodiments have been described with reference to the accompanying drawings. Modifications may be made thereto, and additional embodiments may be implemented, without departing from the broader scope of the invention as set forth in the claims that follow. The specification and drawings are accordingly to be regarded in an illustrative rather than restrictive sense.

While a series of processes have been described above with regard to blocks illustrated in FIGS. 5-7, the order of the processing may be modified in other implementations. In addition, non-dependent processing may be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A system comprising one or more devices that include processors, wherein the processors are configured to:
 receive a request to deploy a network service, associated with a network slice, within a network;
 retrieve an infrastructure profile and a configuration for the network service from catalogs;
 generate network service descriptors based on the infrastructure profile and the configuration for the service; and instantiate the network slice and the network service within the network based on the network service descriptors.

2. The system of claim 1, wherein the request identifies a location within the network, and wherein when the processors instantiate the network slice, the processors are configured to:

instantiate the network slice at the location.

3. The system of claim 1, wherein the network service descriptors are specified in a non-markup language.

4. The system of claim 1, wherein the network service descriptors include a metadata portion, and wherein the metadata portion indicates deployment specific overrides.

5. The system of claim 1, wherein at least one of the network service descriptors specifies a network function, and the instantiated network slice includes an instance of the network function.

6. The system of claim 5, wherein the network service descriptors define a Slice Assurance Service (SAS) and include a virtual network function descriptor that defines an assurance module, and wherein the assurance module includes micro-services.

7. The system of claim 5, wherein the network function includes a Fifth Generation (5G) core network function.

8. The system of claim 1, wherein the network descriptors specify at least one of:

an atomic service;

a regional network service;

a nationwide network service; or a slice infrastructure service.

9. The system of claim 8, wherein the regional network service includes an atomic service, wherein the slice infrastructure service includes one or more of: an atomic service, a regional network service, and a nationwide network service; and wherein the atomic service includes one or more network functions.

10. The system of claim 8, wherein the nationwide network service includes a Fifth Generation (5G) core network function, and wherein the regional network service includes a network function at an edge or a far-edge of the network.

11. A method comprising:

receiving a request to deploy a network service, associated with a network slice, within a network;

retrieving an infrastructure profile and a configuration for the network service from catalogs;

generating network service descriptors based on the infrastructure profile and the configuration for the network service; and instantiating the network slice and the network service within the network based on the network service descriptors.

12. The method of claim 11, wherein the request identifies a location within the network, and wherein instantiating the network slice includes:

instantiating the network slice at the location.

13. The method of claim 11, wherein the network service descriptors are specified in Topology and Orchestration Specification for Cloud Applications (TOSCA) or a YAML Ain't a Markup Language (YAML).

14. The method of claim 11, wherein the network service descriptors include a metadata portion, and wherein the metadata portion indicates deployment specific overrides.

15. The method of claim 11, wherein at least one of the network service descriptors specifies a network function, and the instantiated network slice includes an instance of the network function.

16. The method of claim 15, wherein the network service descriptors define a Slice Assurance Service (SAS) and include a virtual network function descriptor that defines an assurance module, and wherein the assurance module includes micro-services.

17. The method of claim 15, wherein the network function includes a central unit-control plane, a central unit-user plane, or a distributed unit in a radio access network.

18. The method of claim 11, wherein the network descriptors specify at least one of:

an atomic service;

a regional network service;

a nationwide network service; or a slice infrastructure service.

19. A non-transitory computer-readable medium, comprising processor-executable instructions, that, when executed by one or more processors, cause the one or more processors to:

receive a request to deploy a network service, associated with a network slice, within a network;

retrieve an infrastructure profile and a configuration for the network service from catalogs;

generate network service descriptors based on the infrastructure profile and the configuration for the service; and instantiate the network slice and the network service within the network based on the network service descriptors.

20. The non-transitory computer-readable medium of claim 19, wherein at least one of the network service descriptors specifies a network function, and the instantiated network slice includes an instance of the network function.

* * * * *